United States Patent
Czajkowski et al.

(10) Patent No.: US 7,260,562 B2
(45) Date of Patent: Aug. 21, 2007

(54) SOLUTIONS FOR CONSTRAINT SATISFACTION PROBLEMS REQUIRING MULTIPLE CONSTRAINTS

(75) Inventors: Greg Czajkowski, San Francisco, CA (US); Mike F. Miller, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 681 days.

(21) Appl. No.: 10/609,794

(22) Filed: Jun. 30, 2003

(65) Prior Publication Data

US 2005/0010922 A1   Jan. 13, 2005

(51) Int. Cl.
*G06N 5/00* (2006.01)

(52) U.S. Cl. .............................. 706/46; 706/13; 716/4

(58) Field of Classification Search ................ 382/156; 704/8; 706/46, 13; 707/6; 716/1, 4, 8; 703/6, 703/14

See application file for complete search history.

(56) References Cited

U.S. PATENT DOCUMENTS

| | | | | |
|---|---|---|---|---|
| 3,622,762 A | * | 11/1971 | Dyer et al. ..................... 716/4 |
| 4,914,590 A | * | 4/1990 | Loatman et al. ................ 704/8 |
| 5,123,057 A | * | 6/1992 | Verly et al. ................. 382/156 |
| 5,867,397 A | * | 2/1999 | Koza et al. .................... 703/14 |
| 5,987,086 A | * | 11/1999 | Raman et al. .................. 716/1 |
| 6,205,444 B1 | * | 3/2001 | Floratos et al. ................ 707/6 |
| 6,360,191 B1 | * | 3/2002 | Koza et al. .................... 703/6 |
| 6,378,117 B1 | * | 4/2002 | Kirshenbaum ................. 716/8 |
| 6,424,959 B1 | * | 7/2002 | Bennett et al. ............... 706/13 |

* cited by examiner

*Primary Examiner*—Wilbert L. Starks, Jr.
(74) *Attorney, Agent, or Firm*—Blakely, Sokoloff, Taylor & Zafman LLP

(57) ABSTRACT

In one embodiment, the invention includes sorting a set of constraints based on weights associated with each constraint, the constraints being capable of being satisfied based on values selected for corresponding associated parameters, selecting a constraint that is unsatisfied and that has the greatest weight, selecting parameters associated with the constraint and finding parameter values to satisfy the constraint, after satisfying the selected unsatisfied constraint, selecting a further unsatisfied constraint having the next greatest weight and finding values for associated parameters to satisfy the further constraint, and repeating the selecting of further constraints and the finding of values for associated parameters.

30 Claims, 3 Drawing Sheets

SOLUTIONS FOR CONSTRAINT SATISFACTION PROBLEMS REQUIRING MULTIPLE CONSTRAINTS

BACKGROUND

1. Field

The present invention pertains to the field of solving constraint satisfaction problems and, in particular, to solving such problems using weighted constraints and heterogeneous types of data.

2. Related Art

Constraint satisfaction problems (CSP) can be used in a wide variety of different fields including scheduling, resource allocation, planning, time tabling, routing, test generation and configuration. A classical CSP includes at least three components:

A set of parameters $X=\{x1, \ldots, xi\}$ for a total of i parameters;

Domains D setting boundaries for the possible values for each of the parameters $D=\{d1, \ldots, di\}$ for the set of i parameters; and A set of constraints $C=\{c1, c2, c3, c4\}$.

The goal of the classical CSP is to find a complete solution which is an assignment of values to all of the parameters X which satisfy all of the constraints C. Most classical systems deal with either linear programming (LP) or integer programming (IP) in finite domains D.

The most general type of classical CSP creates a random solution set for all of the parameters and tests to determine whether the solution set satisfies all of the constraints. If there is a failure, new values are chosen for all of the parameters and the process is repeated. The process is continued, repeating the selection of new values and testing them, until a satisfactory solution is found.

CSP solvers have been improved by using the results at each test and making small changes or guided changes. There are a variety of different approaches to selecting the set of values to solve the CSP. These can include hill climbing, minimum conflicts, random lot, tabu search, simulated annealing, GLS (Guided Local Search), GENET (Generic Neural NETwork), GSAT (Greedy SATisfiablity), and many different back tracking processes. Each of these improvements tries to select values for parameters based on prior selections or prior satisfaction tests.

CSP solvers. despite these improvements, can still require extensive processing power to arrive at a solution. The amount of processing required increases with the complexity of the CSP. In addition CSP semantics greatly limit flexibility in describing a problem and, for problems with multiple solutions, in steering or orienting the result toward a particular range of parameter values.

BRIEF DESCRIPTION OF THE DRAWINGS

The present invention will be understood more fully from the detailed description given below and from the accompanying drawings of various embodiments of the invention. The drawings, however, should not be taken to limit the invention to the specific embodiments, but are for explanation and understanding only.

DETAILED DESCRIPTION

A classical constraint satisfaction problem (CSP) has at least three components, a set of parameters, domains for the parameters and a set of constraints. The constraint satisfaction solver attempts to find a set of complete solutions which are an assignment of values to the parameters that satisfy all of the constraints. A CSP solver can use a specification language to describe the parameters, domain values, and constraints. This specification language can provide semantics for the specifications of these values.

According to one embodiment of the invention, XML (extensible mark-up language) can be used to specify all of these constraints, parameters, and domain values using XML tags. The domains assign a set of possible values to a parameter. In this way, the values within a domain can become constraints in and of themselves. Using XML tags as a specification language, allows domains to be of different independent data types. These data types can include floating point numbers, strings, hashes, lists and more. Alternatively, other mark-up languages can be used, as well as any other format that allows constraints, parameters and domains to be specified.

Domains can be expressed as discrete independent ranges for parameters or as expressions which include more than one parameter. Interdependent domains with more than one parameter can change as parameter values change. A domain can be written to assign a value to a parameter that depends on a function of another parameter or an external value. Such domains act as constraints in and of themselves. In other words, a domain ($d2$) can be expressed as a function of two different parameters ($x3$, $x4$) $d2=f(x3, x4)$. In another embodiment, domains can include an external value or a pseudorandom number. Such dynamic domains can be combined with leaf domains or the problem may be definable with leaf domains alone. A leaf domain defines only one parameter using fixed values. The values can be any of the types of values mentioned above including floating point numbers, strings, hashes, lists and more.

In one embodiment of the invention, constraints can be expressed as any non-empty set of parameters having some relationship. Constraints can contain several different parameters and can include function calls when expressed in a higher level language such as Java, C++, Perl or Python. A wide range of different constraints can be expressed. Function calls can be dependent not only on the parameters in the system, but also on the state used and managed by the function call. Functions can have an own state or states that are shared among different function calls.

Using higher level languages, parameters, domains and constraints can be defined as expressions. The semantics of such higher level languages allow the expressions to include Boolean or other logical operators.

In addition to parameters, domains, and constraints, one embodiment of the present invention can use weights. The weights can be applied to constraints, domains, parameters, and parameter values. Such weights allow the problem writer to specify a sense of difficulty in finding a solution for a particular aspect of the problem. The weights can be used to prioritize constraints, domains, parameters or parameter values when used in a constraint satisfaction solver. Weights can be applied to parameters or to values to provide a sense of importance for choosing a given value. The value weights can also provide an optimization criterion for a set of different solutions. Values with higher weights can indicate a higher probability that they will be assigned to parameters in a solution, provided that such a solution satisfies all constraints. These weights can be used for creating a distribution of values among a set of different solutions.

In another embodiment of the invention, using a higher level language such as Perl, a hash data structure can be used for applying weights to parameters, constraints, or values. Other higher level languages, such as C++ and Python, provide similar functionality. The priority scheme provided by the hash data structure gives hints to the solver about which parameters are more important than others. One type of weighting scale uses a range of from, for example, 0 to 10. A smaller member of integer values allows simplicity in structuring the problem. In another example, a floating point number can be used. This allows the writer to add additional constraints between other constraints without redefining weights that have already been written.

The priorities provided by constraint weights, domain weights, and parameter weights can be used to generate a plan of attack for resolving conflicts when conflicts arise between different parameters. If, for example, a solution satisfies a constraint, but one parameter of the solution conflicts with another parameter, then the parameter of the lower priority can be altered and a new solution tried for resolving the conflict. This use of weights can help to ensure that the probabilities of particular values conform to user expectations. In a highly conflicted system, the weights given to values of certain parameters may or may not be representative of the actual distribution of those values after selecting parameters. With a priority system, a certain parameter can be taken and given a higher priority than the others. This can be used to affect the resulting distribution of values for that parameter.

Figure 1:
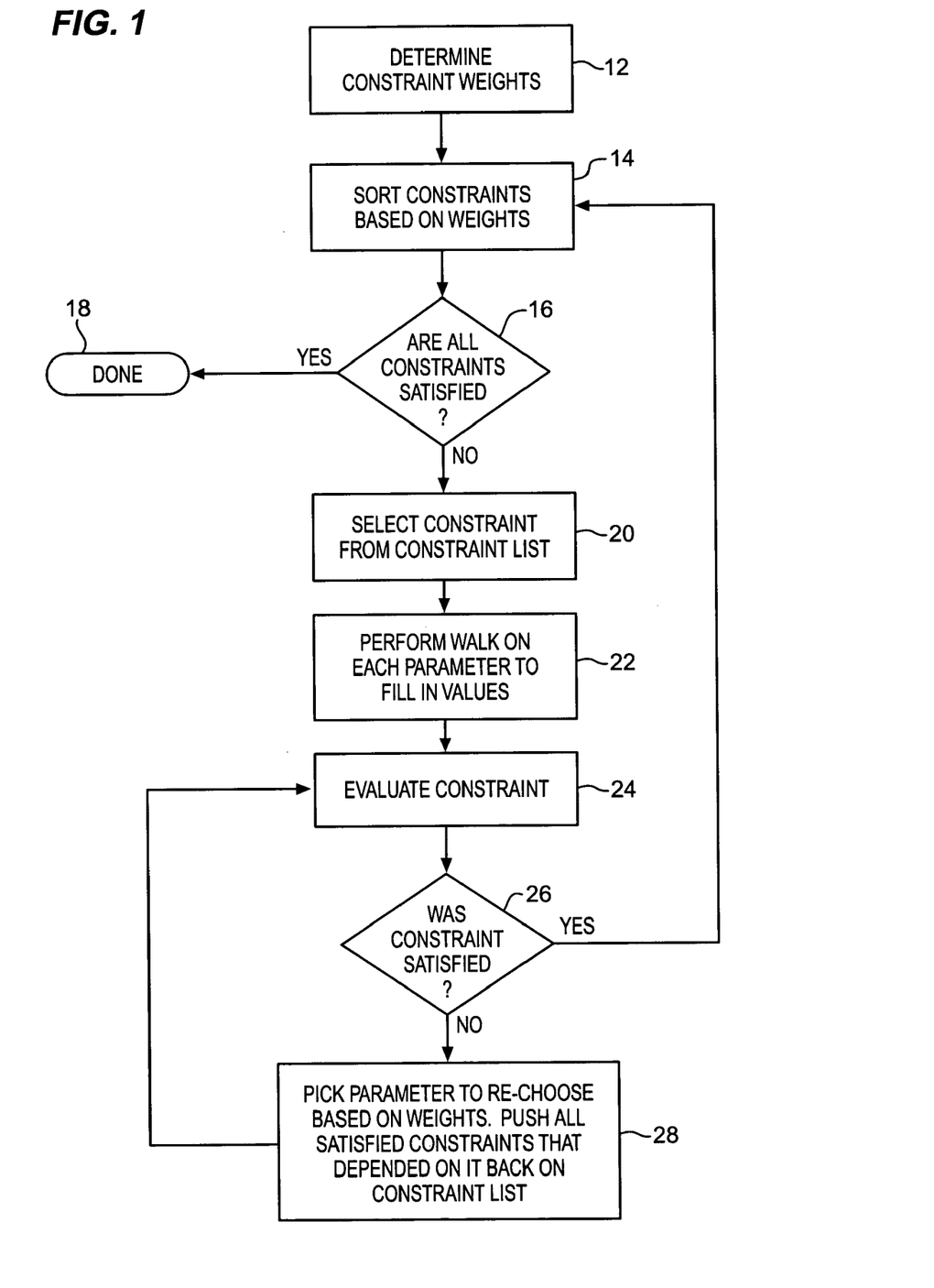
FIG. 1 is a flow chart for solving a constraint satisfaction problem according to one embodiment of the invention.

FIG. 1 shows a flow diagram of a process that can be applied by some embodiments of the present invention. Once a problem is established and parameters, domains, and constraints have been defined, a solver can proceed to run a constraint satisfaction problem (CSP). Initially, the constraints are determined at block 12 and they are sorted at block 14 based on the weights that have been assigned to the constraints. When the constraints have been recognized and sorted, the system can determine if all constraints have been satisfied by the existing set of parameters at block 16. If so, then the process ends at block 18.

Initially, however, there can be some constraints which are not satisfied. The system first selects a constraint from the list of constraints which are not satisfied at block 20 and then selects a parameter associated with that constraint at block 22. The parameter value that is selected can be evaluated against the constraint at block 24 so that it can be determined whether the constraint was satisfied by the selected parameter at block 26. If the constraint is not satisfied, then at block 28 a parameter is reselected based on the weights for the parameters associated with the particular constraint. All the constraints that depend on this parameter are redefined as unsatisfied whenever a new parameter is selected. The new selected parameter is then returned, at block 24, to evaluate against the constraint.

Once the constraint is satisfied at block 26, then the constraints are resorted at block 14. This resorting can include sorting constraints as between those that are satisfied and those that are not. If all the constraints are satisfied at block 16, then the process ends at block 18. If there are further constraints to satisfy, then the cycle of evaluating parameters against constraints is repeated at blocks 20, 22, 24, 26 and 28 as many times as are necessary to satisfy all constraints.

This process can provide satisfaction of constraints and may or may not provide completeness. The set of possible combinations of assignments of values to parameters may be very large and it may not be desired to devote enough resources to find a complete solution set. In most instances, a single solution or several solutions can be found. The particular process for finding values of parameters to satisfy the constraints at block 22 can be a local search or a global systematic search, among others. There are a variety of such techniques available including the TABU search, minimization of conflicts, random walk, and simulated annealing among others.

The selection of a constraint at block 20 can be based on a constraint weight, which can be specifically defined, or it can be based on the average of the cumulative sum of the corresponding domain weights or parameter weights that make up the constraint. Let $Wx_i$ be the cumulative sum of the weights for the ith parameter $x_i$. Then $Wx_i = U + N +$ average (P), where U is the defined weight of the parameter, N is the number of constraints that use this parameter, and P is each of the defined weights of other parameters x that $x_i$ depends upon. This cumulative sum can also be weighted by the number of constraints that use a particular parameter. Accordingly, the constraint weight can be based on parameter weights which depend on the number of constraints which use a parameter. Domain weights $Wd_i$ can be used in a similar way to prioritize constraints. If constraints, domains and parameters all carry weights, then all of the weights can be combined to determine an ordering for the constraints.

The constraint weights present the solving process with a list of constraints that is sorted in a sequential order for application to the solution. Each constraint can be tested as soon as assignments for the parameters involved in the constraint are generated. For a given constraint, each of the parameters can be treated as problems in and of themselves. These problems can be solved in a depth first manner. In one embodiment, for each parameter, a domain value expression is randomly chosen based on its weight, relative to the weight of other value expressions. If the chosen value is a leaf node, then the expression for that parameter is evaluated. Otherwise the process can continue depth first. After the depth first evaluation has completed all the parameter values for a particular constraint, then these values can be plugged into the constraint and the constraint expression can be evaluated for satisfaction.

For example, if constraint satisfaction is determined using Boolean logic, the constraint expression can be tested for Boolean truth. A Boolean positive will pass the test and the solver will move to test the next constraint. A Boolean negative will move the solver to e.g. a heuristic for constraint failure. When the constraint is satisfied, then the process can continue with another constraint. If the constraint is not satisfied then new parameter values are assigned.

Heuristics can be applied to failing constraints until the constraint is satisfied. One such technique is known as backtracking. There are a wide range of different variations of backtracking approaches. In the heuristic, a single parameter can be picked for modification. The parameter can be chosen randomly based on its weight or based on past history. After a parameter has been rechosen, all of its ancestors can be reevaluated and redetermined in a depth first manner. This can ensure that parameter and constraint expressions are not evaluated with stale values.

As described above, embodiments of the present invention can use a notion of hints or weights that can guide a solver in several respects. The weights placed on constraints, domains, and parameters and can serve as an optimizing criteria in the solution. The weights placed on parameter values can serve as a steering criterion in the solution of the problem.

In addition, some embodiments of the present invention can use expressions in a dynamic interpretive language such as C++, Perl and Python. Such languages can represent different kinds of data. The domain values offer flexibility by being linked directly to parameters. As a result, the solver can apply a hierarchical dependency tree of domain values, parameters, and constraints. XML tags allow a variety of different ways to define data types.

By applying local search and backtracking techniques that are directed by the weight system, problems can be solved quite quickly. In one embodiment, when a constraint failure is encountered, the process backtracks in single parameters and uses the respective cumulative weights. In another embodiment, when resolving hierarchical parameters and constraints, any parameter whose domain is discrete and singular (contains a single value) can be solved using domain propagation. In other words, domain propagation is applied to add the parameters that depend upon the selected parameter. Accordingly, the change in this singular value is propagated up through the hierarchy without the need to perform a selection of the other dependent parameter values.

Figure 2:
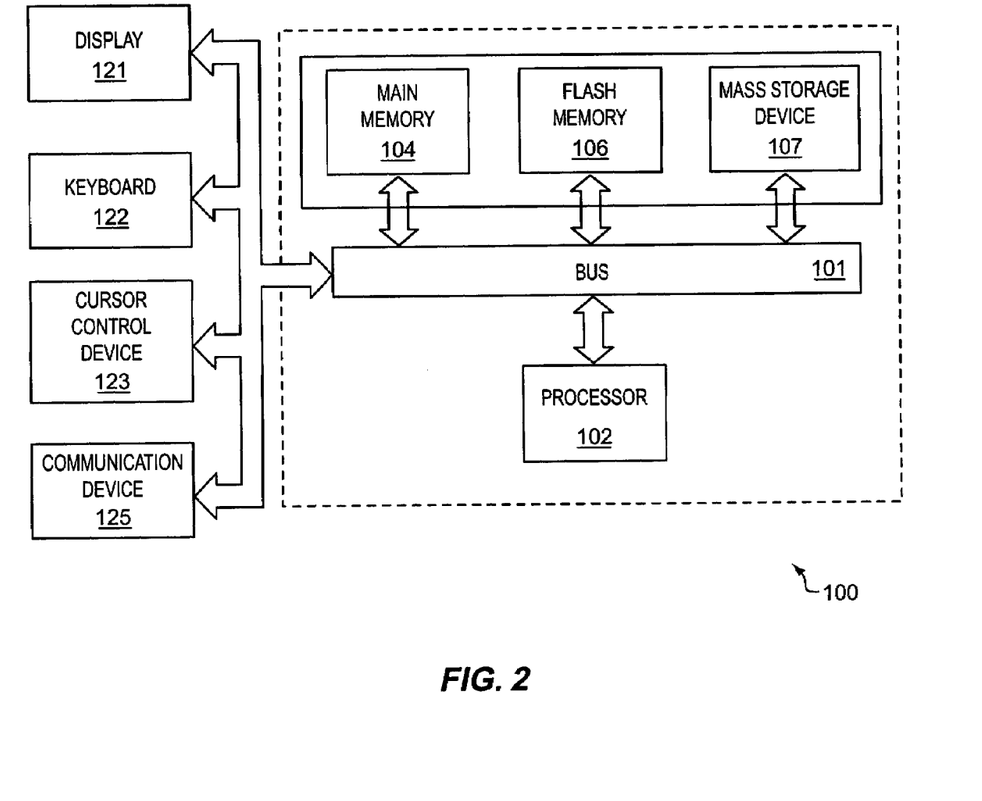
FIG. 2 is a block diagram of a computer system suitable for implementing one embodiment of the invention.

FIG. 2 shows an example of a computer system 100 that can be used with some embodiments of the present invention. The computer system can be implemented as a server, workstation, desktop, tablet, or portable machine. It can also be implemented in one or more small portable platforms such as a notebook, a PDA (Personal Digital Assistant), or wireless web devices, and other devices. The computer system includes a bus or other communication means 101 for communicating information, and a processing means such as a microprocessor 102 coupled with the bus 101 processing information.

The computer system can include a main memory 104, such as a random access memory (RAM) or other dynamic data storage device, coupled to the bus 101 for storing information and instructions to be executed by the processor 102. The main memory can also be used for storing temporary variables or other intermediate information during execution of instructions by the processor.

The computer system also includes a nonvolatile flash memory 106, coupled to the bus for storing static information and instructions for the processor. A mass memory 107 such as a magnetic disk or optical disk and its corresponding drive can also be coupled to the bus of the computer system for storing information and instructions.

The computer system can also be coupled via the bus to a display device or monitor 121, such as a cathode ray tube (CRT) or Liquid Crystal Display (LCD), for displaying information to a user. For example, graphical or text messages, web clippings and other data may be presented to the user on the display device. Typically, an alphanumeric input device 122, such as a keyboard with alphanumeric, function and other keys, may be coupled to the bus for communicating information and command selections to the processor. A cursor control input device 123, such as a mouse, a trackball, cursor, direction keys, or stylus pad can be coupled to the bus for communicating direction information and command selections to the processor and to control cursor movement on the display 121. A microphone 124 and speaker 125 can also be connected to the bus for communications purposes or to play back any stored sounds.

One or more external communications interfaces 125 can also be coupled to the bus 101. These devices include, but are not limited to a modem, a network interface card, or other well known interface devices, such as those used for coupling to Ethernet, token ring, or other types of physical attachment for purposes of providing a communication link to support a local or wide area network (LAN or WAN), for example. The interfaces may be wired or wireless. In this manner, the computer system may also be coupled to a number of clients or servers via a conventional network infrastructure, including an intranet or the Internet, for example. The communications interface can be coupled to the computer system in any of a variety of ways including PCMCIA, MultiMedia, SDIO card, Compact PCI, ISA (Industry Standard Architecture), and an internal motherboard bus. The radio may also be a separate device, connected to the computer by cabling or similar electrical interface.

It is to be appreciated that a lesser or more equipped computer system than the example described above may be preferred for certain implementations. Therefore, the configuration of the computer system will vary from implementation to implementation depending upon numerous factors, such as price constraints, performance requirements, technological improvements, or other circumstances. Embodiments of the invention can also be applied to other types of software-driven systems that use different hardware architectures than that shown in FIG. 2.

Figure 3:
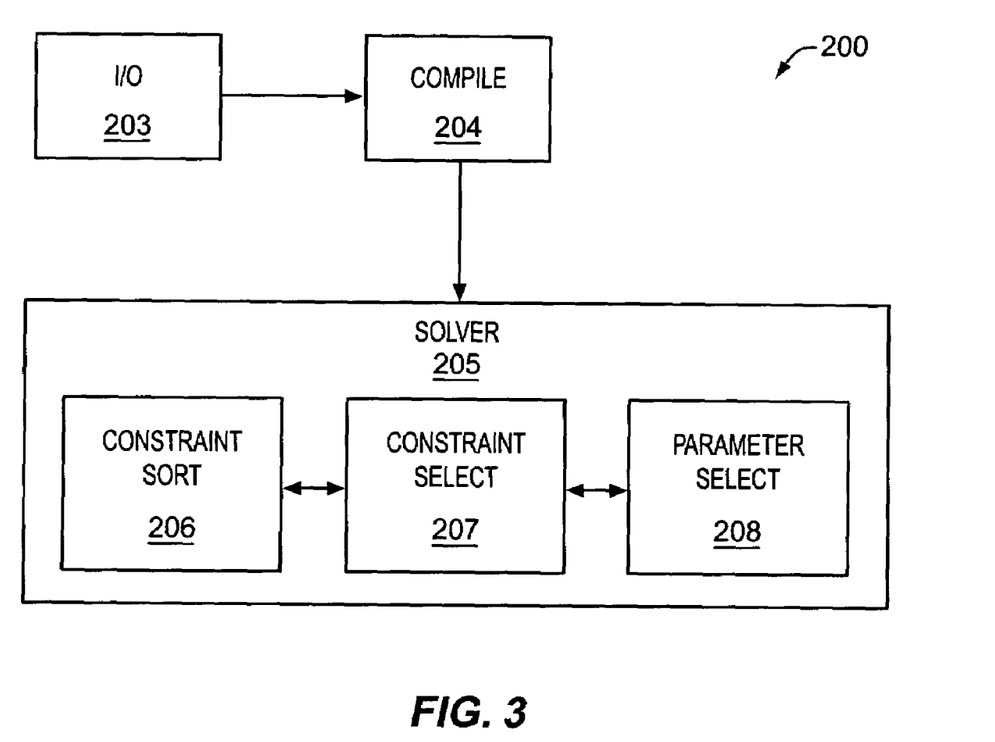
FIG. 3 is a block diagram of a system for solving CSPs suitable for implementing an embodiment of the invention.

FIG. 4 shows a block diagram of a system 200 for solving CSPs suitable for implementing an embodiment of the present invention. In FIG. 4, an I/O interface 203 receives metadata regarding a set of constraints. As an example, the I/O interface can be any one or more of the communications interfaces 125, described above or any other device on the bus 101. As described above with respect to FIG. 1, the constraints can be associated with weights.

The I/O interface is coupled to a compiler 204 to convert the metadata into operable information, and the compiler is coupled to a CSP solver 205. As described above, the metadata can be used to define different data types and the metadata can be in the form of metatext. The constraint solver includes a constraint sorter 206, a constraint selector 207 and a parameter selector 208. The solver can be provided as a computer program product or by hardware components.

The constraint sorter sorts the set of constraints based on the weights associated with each constraint. Upon the satisfaction of a constraint; the constraint sorter repeats the sorting of constraints. The constraint selector selects a constraint that is unsatisfied and that has the greatest weight. After the selected unsatisfied constraint is satisfied, the constraint selector can select a further unsatisfied constraint having the next greatest weight. The parameter selector selects parameters associated with selected constraints and finds parameter values to satisfy the constraints. As described above with respect to FIG. 1, the constraints are capable of being satisfied based on values selected for corresponding associated parameters.

In another embodiment, the constraint selector selects further constraints and the parameter selector finds further values for associated parameters until the set of constraints is satisfied. The constraint sorter can evaluate satisfied constraints after values for parameters associated with an unsatisfied constraint are found. If a satisfied constraint is not satisfied using the found parameter values, then the constraint sorter can designate the constraint as unsatisfied.

In one embodiment, the invention can be used to validate a circuit or microprocessor design. In such an embodiment, parameters can be used as named references to sets. These sets can have one or more values. These values can help direct and expose a wide space of possible solutions. Parameters can be used to specify content generation, paging modes, segment locations, thread allocation, how code gets generated and allocated, registers and their usage, cache/TLB/State initialization, bus emulator commands, memory initialization, system options, build options, DUT (Device Under Test) options and more.

Parameters can contain many attributes; including the values that the parameter takes. Parameters can be used in constraints to remove or restrict certain combinations from taking place. In one embodiment, parameters have a list of possible values (which may be dependent on other parameters), a list of weights (one per value prioritizing how they will be chosen with regards to other values), a weight priority (how important is preserving the weights), a scope, repeat attributes for multiple parameters with the same value sets, and a mode relationship for combining parameters from many definitions. Parameters can also be written in a high level language, such as Java, Python, Perl, C++, etc., as complex expressions that incorporate the values of other parameters.

Constraints can be used to regulate possible solutions to the parameters. They can be used to remove illegal cases of parameter values. They can also be used to tune how content gets generated, biasing out or biasing in different modes of operation. Constraints can be defined by the prohibited relationship, and a list of parameters that comprise the conflict (based on the relationship). Constraints can be defined using a Boolean equation with an expression based around parameters.

Tests or test generators can be created as files, which use parameters, constraints, and libraries to create test case files. An XML section can contain a declaration of parameters, constraints, and segment definitions that are used within the test. The test files can then contain the content that generates an assembly language test. libraries and templates can be applied to this content as appropriate for the architecture of the system to be tested.

In the description above, for purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form.

The present invention can include various steps. The steps of the present invention may be performed by hardware components, such as those shown in FIG. 2, or may be embodied in machine-executable instructions, which may be used to cause a general-purpose or special-purpose processor or logic circuits programmed with the instructions to perform the steps. Alternatively, the steps may be performed by a combination of hardware and software.

The present invention may be provided as a computer program product which may include a machine-readable medium having stored thereon instructions which may be used to program a computer (or other electronic devices) to perform a process according to the present invention. The machine-readable medium may include, but is not limited to, floppy diskettes, optical disks, CD-ROMs, and magneto-optical disks, ROMs, RAMs, EPROMs, EEPROMs, magnet or optical cards, flash memory, or other type of media/machine-readable medium suitable for storing electronic instructions. Moreover, the present invention may also be downloaded as a computer program product, wherein the program may be transferred from a remote computer to a requesting computer by way of data signals embodied in a carrier wave or other propagation medium via a communication link (e.g., a modem or network connection).

Many of the methods and apparatus are described in their most basic form but steps can be added to or deleted from any of the methods and components can be added or subtracted from any of the described apparatus without departing from the basic scope of the present invention. It will be apparent to those skilled in the art that many further modifications and adaptations can be made. The particular embodiments are not provided to limit the invention but to illustrate it. The scope of the present invention is not to be determined by the specific examples provided above but only by the claims below.

What is claimed is:

1. A method comprising:
    identifying a plurality of circuit parameters, the parameters specifying different aspects of a design for an electronic circuit, each parameter having a plurality of different possible values;
    sorting a set of constraints based on weights associated with each constraint, the constraints being capable of being satisfied based on values selected for corresponding associated parameters, the constraints limiting possible values for the corresponding associated parameters;
    selecting a constraint that is unsatisfied and that has the greatest weight;
    selecting parameters associated with the constraint and finding parameter values to satisfy the constraint;
    after satistying the selected unsatisfied constraint, selecting a further unsatisfied constraint having the next greatest weight and finding values for associated parameters to satisfy the further constraint;
    repeating the selecting of further constraints and the finding of values for associated parameters; and
    defining the electronic circuit using the found parameter values.

2. The method of claim 1, wherein repeating comprises repeating the selecting of further constraints and the finding of values for associated parameters until the set of constraints is satisfied.

3. The method of claim 1, further comprising evaluating satisfied constraints after finding values for parameters associated with an unsatisfied constraint and, if a satisfied constraint is not satisfied using the found parameter values, ten designating the constraint as unsatisfied.

4. The method of claim 1, wherein finding parameter values comprises performthing a depth first walk of each selected associated parameter.

5. The method of claim 1, wherein finding parameter values comprises selecting parameters associated with a different constraint, finding parameter values to satisfy the different constraint, and then finding parameter values for the selected constraint.

6. The method of claim 1, further comprising tagging satisfied parameters as unsatisfied after finding parameter values to satisfy the different constraint.

7. The method of claim 1, wherein the parameters correspond to different data types.

8. The method of claim 1, wherein the different data types comprise numbers and strings.

9. The method of claim 1, wherein the parameters are further defined by domains and the domains include numerical ranges and lists.

10. The method of claim 1, further comprising deriving weights for association with constraints using at least one of parameter weights and parameter domain weights.

11. A machine-readable medium having stored thereon data representing instructions which, when executed by a machine, cause the machine to perform operations comprising:
identifying a plurality of circuit parameters, the parameters specifying different aspects of a design for an electronic circuit, each parameter having a plurality of different possible values;
sorting a set of constraints based on weights associated with each constraint, the constraints being capable of being satisfied based on values selected for corresponding associated parameters, the constraints limiting possible values for the corresponding associated parameters;
selecting a constraint that is unsatisfied and that has the greatest weight;
selecting parameters associated with the constraint and finding parameter values to satisfy the constraint;
after satisfying the selected unsatisfied constraint, selecting a further unsatisfied constraint having the next greatest weight and finding values for associated parameters to satisfy the further constraint;
repeating the selecting of further constraints and the finding of values for associated parameters; and
defining the electronic circuit using the found parameter values.

12. The medium of claim 11, wherein the instructions for repeating comprise instructions which, when executed by the machine, cause the machine to perform further operations comprising repeating the selecting of further constraints and the finding of values for associated parameters until the set of constraints is satisfied.

13. The medium of claim 11, wherein the instructions for finding parameter values comprise instructions which, when executed by the machine, cause the machine to perform further operations comprising selecting parameters associated with a different constraint, finding parameter values to satisfy the different constraint, and then finding parameter values for the selected constraint.

14. The medium of claim 11, wherein the parameters correspond to different data types.

15. The medium of claim 11, wherein the parameters are further defined by domains, the domains are associated with weights, and the domains include numerical ranges and lists.

16. The medium of claim 11, further comprising instructions which, when executed by the machine, cause the machine to perform further operations comprising deriving weights for association with constraints using at least one of parameter weights and parameter domain weights.

17. An apparatus comprising:
a memory containing information regarding a plurality of circuit parameters, the parameters specifying different aspects of a design for an electronic circuit, each parameter having a plurality of different possible values, a set of constraints, the constraints being associated with weights, and the constraints being capable of being satisfied based on values selected for corresponding associated parameters; and
a processor to solve a constraint satisfaction problem by:
sorting the set of constraints based on the weights associated with each constraint;
selecting a constraint that is unsatisfied and that has the greatest weight;
selecting parameters associated with the constraint and finding parameter values to satisfy the constraint;
after satisfying the selected unsatisfied constraint, selecting a further unsatisfied constraint having the next greatest weight and finding values for associated parameters to satisfy the further constraint;
repeating the selecting of further constraints and the finding of values for associated parameters; and
defining the electronic circuit using the found parameter values.

18. The apparatus of claim 17, wherein repeating comprises repeating the selecting of further constraints and the finding of values for associated parameters until the set of constraints is satisfied.

19. The apparatus of claim 17, wherein the processor further solves the constraint satisfaction problem by evaluating satisfied constraints after finding values for parameters associated with an unsatisfied constraint and, if a satisfied constraint is not satisfied using the found parameter values, then designating the constraint as unsatisfied.

20. The apparatus of claim 17, wherein the information is stored as metatext in a markup language.

21. The apparatus of claim 17, wherein the metatext defines different data types.

22. A system comprising:
an I/O interface to receive metadata regarding a plurality of circuit parameters, the parameters specifying different aspects of a design for an electronic circuit, each parameter having a plurality of different possible values and regarding a set of constraints, the constraints being associated with weights, the constraints limiting possible values for the corresponding associated parameters, and the constraints being capable of being satisfied based on values selected for corresponding associated parameters;
a compiler to convert the metadata into operable information;
a constraint softer to sort the set of constraints based on the weights associated with each constraint, and to repeat the sorting of constraints upon the satisfaction of a constraint;
a constraint selector to select a constraint that is unsatisfied and that has the greatest weight, and after the selected unsatisfied constraint is satisfied, selecting a further unsatisfied constraint having the next greatest weight; and
a parameter selector to select parameters associated with selected constraint and find parameter values to satisfy the constraints, and to thereby define the electronic circuit using the found parameter values.

23. The system of claim 22, wherein the constraint selector selects further constraints and the parameter selector finds further values for associated parameters until the set of constraints is satisfied.

24. The system of claim 22, wherein the constraint sorter evaluates satisfied constraints after values for parameters associated with an unsatisfied constraint are found and, if a satisfied constraint is not satisfied using the found parameter values, then designates the constraint as unsatisfied.

25. The system of claim 22, wherein the metatext defines different data types.

26. A method comprising:
selecting a set of circuit parameters to specify different aspects of a design of an electronic circuit, where each parameter has a plurality of different possible values;
defining domains for each of the parameters;
establishing constraints to limit possible values of the parameters;

applying a weight to each constraint, the weight being related to the priority of the constraint;

setting relationships between the parameters and the constraints; and solving for an optimal set of parameter values to define the electronic circuit.

27. The method of claim 26, further comprising expressing the domains as metatext and expressing the constraints in a higher level language.

28. The method of claim 26, further comprising assigning weights to each of the parameters.

29. The method of claim 26, further comprising assigning weights to possible value for at least some of the parameters.

30. The method of claim 26, wherein establishing constraints comprises defining relationships among the parameters.

* * * * *

UNITED STATES PATENT AND TRADEMARK OFFICE
CERTIFICATE OF CORRECTION

PATENT NO. : 7,260,562 B2 Page 1 of 1
APPLICATION NO. : 10/609794
DATED : November 21, 2007
INVENTOR(S) : Czajkowski et al.

It is certified that error appears in the above-identified patent and that said Letters Patent is hereby corrected as shown below:

In column 5, at line 35, before "processing" insert --for--.

Signed and Sealed this

Thirteenth Day of May, 2008

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 7,260,562 B2 | Page 1 of 1 |
| APPLICATION NO. | : 10/609794 | |
| DATED | : August 21, 2007 | |
| INVENTOR(S) | : Czajkowski et al. | |

It is certified that error appears in the above-identified patent and that said Letters Patent is hereby corrected as shown below:

In column 5, at line 35, before "processing" insert --for--.

This certificate supersedes the Certificate of Correction issued May 13, 2008.

Signed and Sealed this

Third Day of June, 2008

JON W. DUDAS
*Director of the United States Patent and Trademark Office*